(12) United States Patent
Kolar et al.

(10) Patent No.: US 8,570,776 B2
(45) Date of Patent: Oct. 29, 2013

(54) METHOD AND DEVICE FOR DETERMINING A CONTROL SCHEME FOR AN ACTIVE POWER FILTER

(75) Inventors: Johann W. Kolar, Zürich (CH); Thiago Soeiro, Zürich (CH); Per Ranstad, Växjö (SE); Jörgen Linner, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 232 days.

(21) Appl. No.: 13/117,972

(22) Filed: May 27, 2011

(65) Prior Publication Data

US 2012/0300514 A1 Nov. 29, 2012

(51) Int. Cl.
   *H02M 1/12* (2006.01)
(52) U.S. Cl.
   USPC .............. 363/40; 363/79; 363/89; 363/97
(58) Field of Classification Search
   USPC ............ 363/39, 40, 41, 78, 79, 89, 97
   See application file for complete search history.

(56) References Cited

U.S. PATENT DOCUMENTS

| | | | |
|---|---|---|---|
| 7,495,938 B2* | 2/2009 | Wu et al. .................... | 363/40 |
| 7,502,237 B2* | 3/2009 | Pratel et al. ................ | 363/39 |
| 7,706,163 B2* | 4/2010 | Tan et al. ................... | 363/132 |
| 8,144,490 B2* | 3/2012 | El-Barbari et al. ......... | 363/43 |
| 8,441,820 B2* | 5/2013 | Shen et al. ................. | 363/56.01 |
| 8,446,742 B2* | 5/2013 | Hattori et al. .............. | 363/16 |
| 2012/0147639 A1* | 6/2012 | Mao et al. .................. | 363/98 |

FOREIGN PATENT DOCUMENTS

WO  WO 2007/048420 A1  5/2007

OTHER PUBLICATIONS

B. Kaku et al., "Switching loss minimised space vector PWM method for IGBT three-level inverter", IEE Proc.-Electr. Power Appl., Vil. 144, No. 3, May 1997, pp. 182-190.

Thomas Brückner et al., "The Active NPC Converter and Its Loss-Balancing Control", IEEE Transactions on Industrial Electronics, vol. 52, No. 3, Jun. 2005, pp. 855-868.

Ralph Teichmann et al., "A Comparison of Three-Level Converters Versus Two-Level Converters for Low-Voltage Drives, Traction, and Utility Applications", IEEE Transactions on Industry Applications, vol. 41, No. 3, May/Jun. 2005, pp. 855-865.

(Continued)

*Primary Examiner* — Adolf Berhane
*Assistant Examiner* — Lakaisha Jackson
(74) *Attorney, Agent, or Firm* — Rita D. Vacca

(57) ABSTRACT

A method is provided for determining a control scheme for a voltage source converter (VSC) with a topology of three bridge legs between each of three phases of a grid and a neutral point. The method includes: analyzing the waveform of the grid and/or a load voltage and determining an allowed period for no-swilching of the corresponding bridge leg; operating the VSC with different clamping carrier modulator frequencies, and then analyzing the balance in the operating junction temperatures and/or power losses across the active switches and also analyzing the total losses of the VSC; comparing the balance and the total losses of different clamping carrier modulator frequencies and selecting the clamping carrier modulator frequency; operating the VSC with the selected clamping carrier modulator frequency, and optimizing the balance in the operating junction temperatures and/or power losses across the active switches and the total losses of the VSC.

26 Claims, 14 Drawing Sheets

(56) References Cited

OTHER PUBLICATIONS

Takashi Anzawa et al., "Power Cycle Fatigue Reliability Evaluation for power Device Using Coupled Electrical-Thermal-Mechanical Analysis", 2008, pp. 815-821.

C. Bailey et al., "Reliability Analysis for Power Electronics Modules", 2007, pp. 12-17.

Takaharu Takeshita et al., "PWM Control and Input Characteristics of Three-Phase Multi-Level AC/DC Converter", 1992, pp. 175-180.

* cited by examiner (a)

METHOD AND DEVICE FOR DETERMINING A CONTROL SCHEME FOR AN ACTIVE POWER FILTER

FIELD

The present disclosure relates to a method for determining a control scheme for an active power filter, such as a neutral point clamped (NPC) voltage source converter (VSC) with at least 3 levels, for example.

BACKGROUND INFORMATION

Shunt active power filters are used to minimize the harmonic disturbances created by non-linear loads as they improve the filtering efficiency, and also solve many issues arising with classical passive filters. During the design of such a system, special attention has to be paid to the load currents, which are intended to be compensated. Together with the modulation strategy employed, the load currents are the variables that determine the circulating current in the power devices of the selected Voltage Source Converter (VSC). Especially in 3-level NPC (Neutral Point Clamped) active filters, the commonly irregular load can lead to an uneven loss distribution in the semiconductors of a bridge leg. As in every converter, the losses in the most stressed device limit the switching frequency and the power capability, a de-rating of the converter current can become mandatory to ensure long term-stability of the system.

The semiconductor chips assembled in a standard commercial 3-level NPC bridge leg module are mostly dimensioned and rated neglecting the loss distribution over the specific elements. In this manner, due to the issue of loss distribution, the usage of these devices often results in an oversized design with expensive and weakly utilized semiconductor area. Additionally, modulation schemes used to enhance the system efficiency can contribute even more to the uneven loss distribution, increasing the difference of the operating temperature of the transistors and diodes inside the power module and/or widening their thermal cycling. The thermal mismatch of components leads to induced thermal stresses on the materials within the module and thermo-mechanical damage could arise. Consequently, the design of 3-level NPC active filters becomes rather complex as the desired characteristics of high power density, efficiency and component reliability could work against each other.

Due to the unequal distribution of losses and consequent mismatch of junction temperature distribution among the bridge-leg's semiconductors, in the situation of high power converters, for example, the usage of NPC power modules can result in low semiconductor utilization. In this way, the usage of single semiconductor devices, rated differently, are more indicated to build the bridge-legs of the converter. NPC systems, employing single semiconductors similarly rated, usually have these devices installed in separate heat sinks, in order to achieve a good thermal decoupling of the individual components. However, the usage of different single semiconductors and/or separate heating sinks can result in cost increments and bulky systems.

SUMMARY

An exemplary embodiment of the present disclosure provides a method for determining a control scheme for a neutral point clamped (NPC) voltage source converter (VSC) with at least 3 levels and a topology of three bridge legs between each of three phases of a grid and a neutral point, each leg including at least four active switches. A clamping carrier modulator is synchronized with the grid for the control of no-switching intervals, and performs the method. The exemplary method includes i) analyzing the waveform of at least one of the grid and a load voltage, and determining windows of 120° within the voltage cycle of the grid/load. The windows are centered around a positive and negative peak maximum of the grid/load voltage waveform, and the windows define an allowed period for no-switching of the corresponding bridge leg. The exemplary method also includes ii) operating and/or simulating an operation of the voltage source converter with a clamping carrier modulator frequency equal to the third harmonic frequency of the grid/load, wherein, if within the window, as a function of the clamping carrier modulator the switching of the corresponding bridge leg is interrupted and clamped, and then analyzing the balance in the operating junction temperatures and/or power losses across the active switches and also analyzing the total losses of the voltage source converter. The exemplary method includes iii) operating and/or simulating the operation of the voltage source converter with a clamping carrier modulator frequency equal to the ninth harmonic frequency of the grid/load, wherein, if within the window, as a function of the clamping carrier modulator, the switching of the corresponding bridge leg is interrupted and clamped, and then analyzing the balance in the operating junction temperatures and/or power losses across the active switches and the total losses of the voltage source converter. In addition, the exemplary method includes iv) comparing the balance and the total losses of steps ii) and iii) and selecting either the clamping carrier modulator frequency according to step ii) or step iii) showing, as primary criterion, the better balance and, as secondary criterion, the lower total losses. The exemplary method also includes v) operating or simulating the operation of the voltage source converter with the selected clamping carrier modulator frequency, wherein as a function of the clamping carrier modulator the switching of the corresponding bridge leg is interrupted and clamped in as far as within the window, while iteratively changing at least one of the following operating parameters of the voltage source converter: switching frequency, DC-link voltage reference, duty cycle of clamping carrier modulator, phase shift of the clamping carrier modulator relative to the grid, and optimising the balance in the operating junction temperatures and/or power losses across the active switches and the total losses of the voltage source converter as a function of the adjustment of these operating parameters until reaching optimum operation parameters for the control scheme.

BRIEF DESCRIPTION OF THE DRAWINGS

Additional refinements, advantages and features of the present disclosure are described in more detail below with reference to exemplary embodiments illustrated in the drawings, which are for the purpose of illustrating exemplary embodiments of the present disclosure and not for the purpose of limiting the same. In the drawings.

DETAILED DESCRIPTION OF EXEMPLARY EMBODIMENTS

Figure 1:
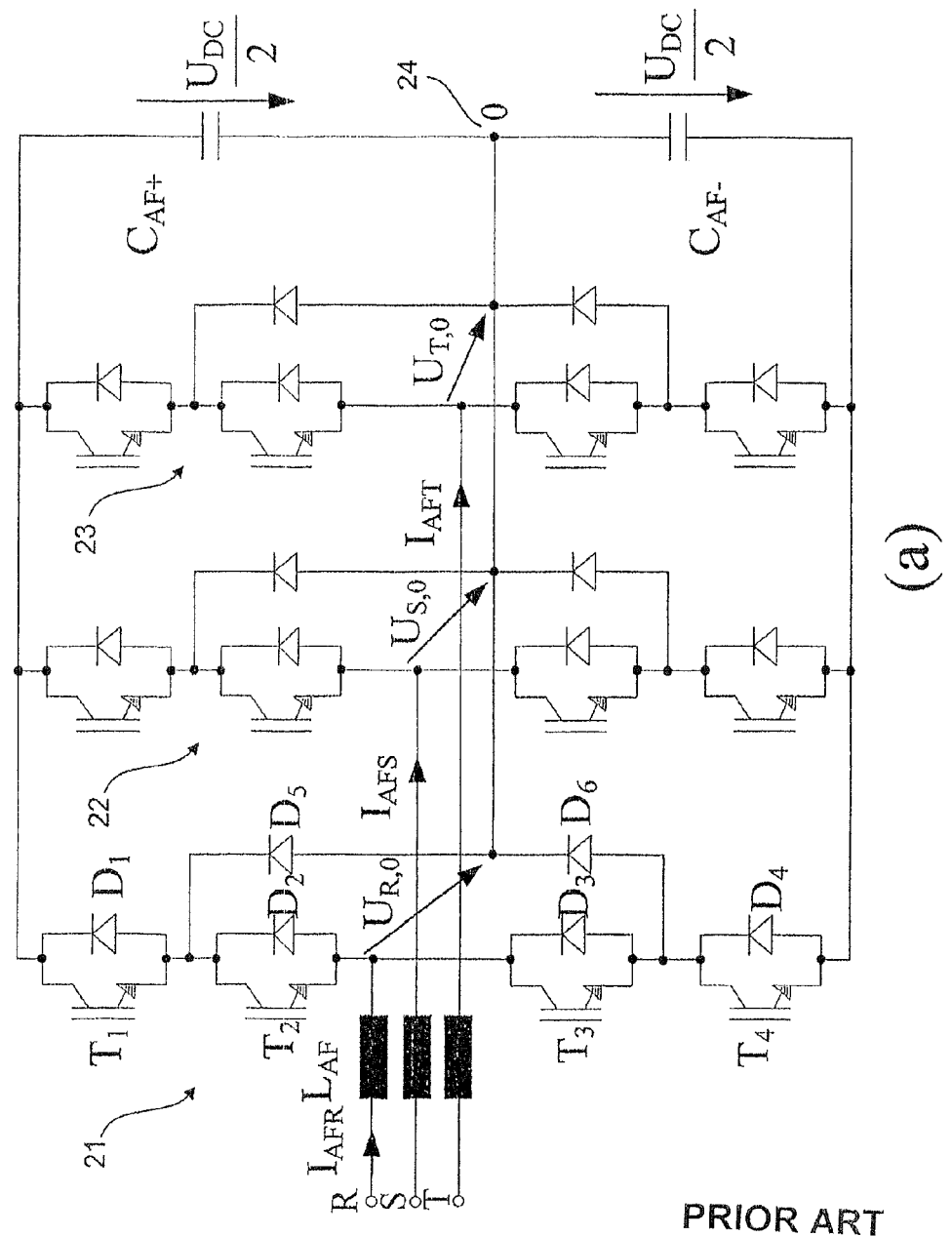
FIG. 1 shows examples of active filters based on: (a) Conventional 3-level NPC VSC; (b) 3-level A-NPC VSC; (c) 2-level VSC; and (d) 3-level T-type converter.
Figure 1:
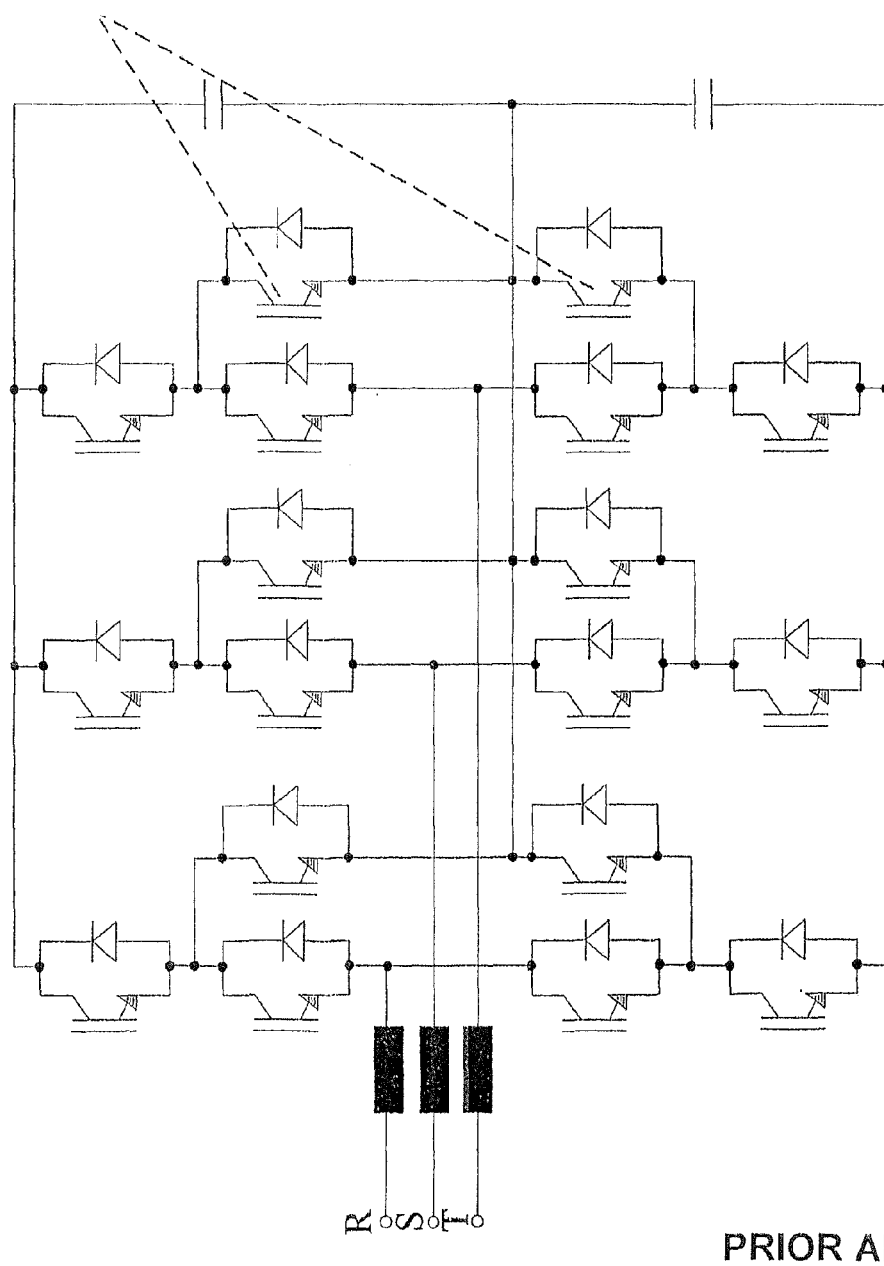
Figure 1:
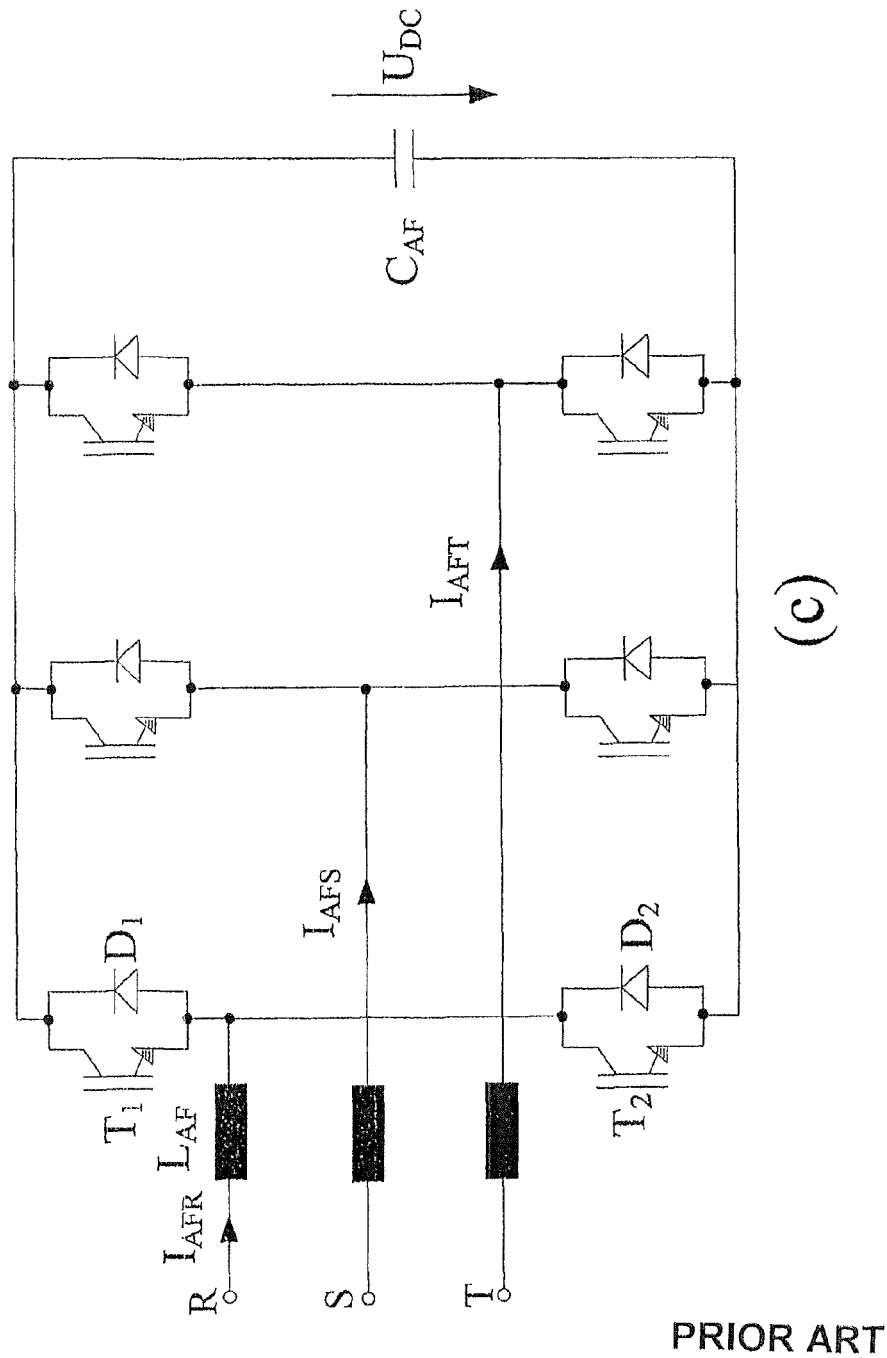
Figure 1:
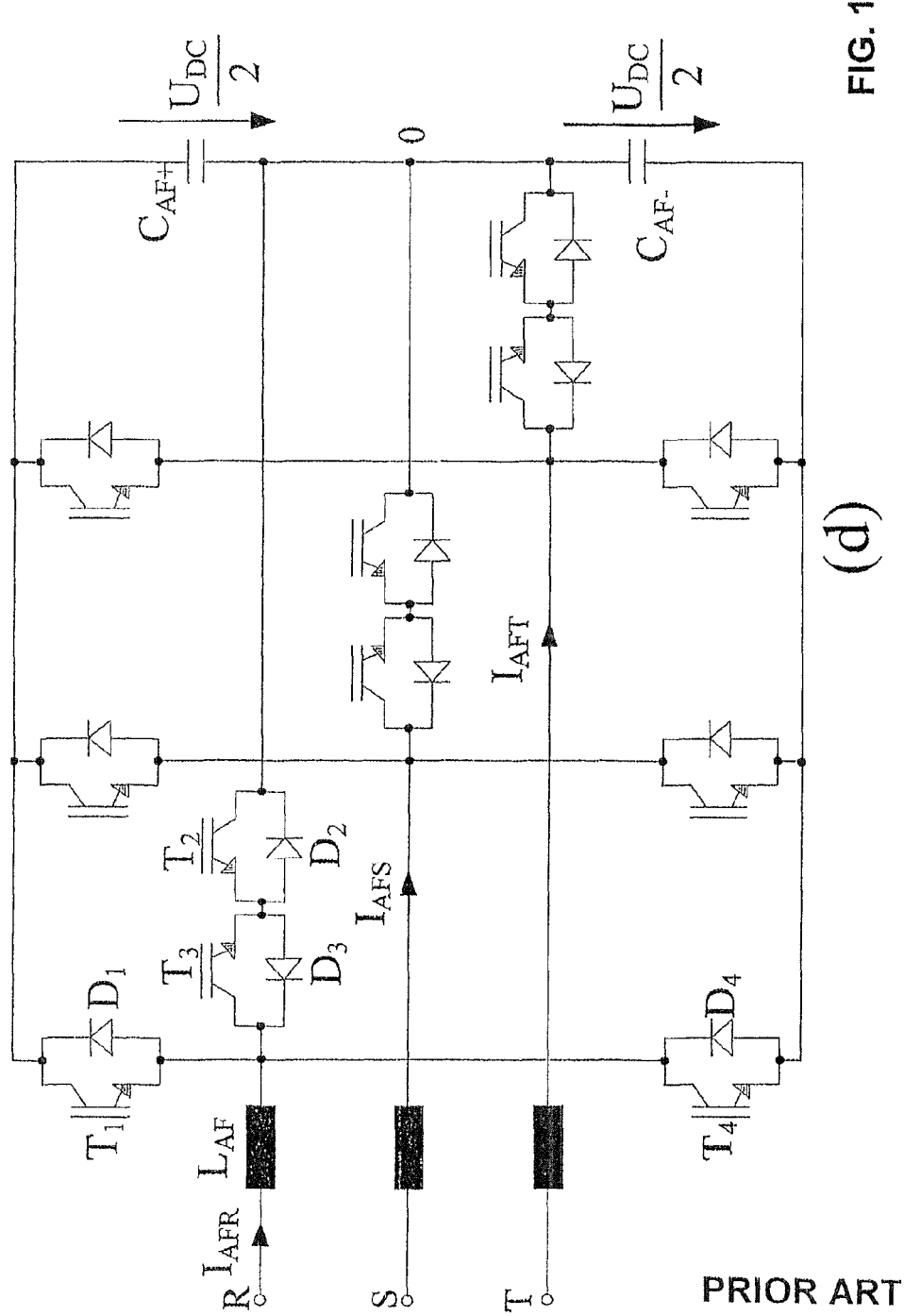

To address the loss distribution issue of the conventional NPC active filters, while the efficiency of the system is kept high, exemplary embodiments of the present disclosure provide a space vector modulation scheme incorporating an optimal clamping of the phase. With no additional circuitry to the conventional NPC, for most of the typical industrial loads, exemplary embodiments of the present disclosure provide that active filters employing standard commercial NPC bridge leg modules can have their losses well distributed over the chip dies, leading to only a small difference of their operating temperature. In addition, other exemplary embodiments of the present disclosure provide a suitable control method of balancing the DC-link voltages and, to some extent, maintaining the optimal clamping of the currents.

In accordance with an exemplary embodiment, depending on the current shape of the load compensated by the active filter, the top and bottom DC-link capacitors can be alternately loaded according to a carrier signal with 3 or 9 times the fundamental frequency of the grid. For example, for a high frequency operation, a considerable reduction of losses can be achieved by clamping (e.g., closing all upper or middle-leg switches in) the bridge leg which handles the highest current values. By increasing the frequency of the clamping carrier and avoiding that the switching intervals match the instant of high current values, a better controllability of the loss distribution among the bridge leg components can be obtained. Note that both exemplary clamping strategies are intended to balance the operating junction temperatures and/or the power losses across the transistors (IGBTs), while the total losses of the system are minimized. Accordingly, mainly the operating switching frequency needs to be strategically selected. In fact, the loss distribution across the components of a bridge leg can be strongly dependent on the switching frequency and DC-link voltage operation. These variables are proportional to the switching losses and they can be used together with the current clamping scheme to optimally design the active filter for a specific semiconductor technology and compensated load.

The synchronization of the carrier modulator with the grid voltages or load currents is important to perform the clamping during the desired non-switching intervals. The optimal current clamping can be previously defined by an accurate analysis of the necessarily known load currents. In cases where the displacement of the load current varies considerably with the handled power, a look-up table can be built and stored (e.g., in a non-volatile, non-transitory computer-readable recording medium, such as ROM, a hard disk drive, optical memory, flash memory, etc.) to tune the carrier according to the instant power processed by the load. In cases where the load is unknown, the clamping strategy can be adapted during operation by a computer processing device executing an algorithm which predicts the losses across the transistors of one phase leg. The calculation can incorporate the space vector modulation such that the impact of the current clamping pattern is considered correctly according to the compensated load. With the defined modulation index, the relative on-times/transitions of the discrete voltage space vectors can be determined. Thus, by combining this information with the known conduction/switching loss characteristics of the employed semiconductors, the averaged conduction and switching losses over one switching period can be calculated. By storing the loss data calculated in each switching period, the mean losses over a fundamental grid period in each transistor device can be obtained recursively. Finally, after every switching period, adjustments on the variables, directly related to component losses, can be performed in order to equalize power losses in these devices (e.g., switching frequency, fs, DC-link voltage reference, uDC_ref, clamping pattern's duty cycle, D, and phase, φ).

It is important to mention that the clamping scheme can be used to other 3-level VSC topologies, such as the T-type VSC as e.g. depicted in FIG. 1(d).

Operation conditions, such as under strongly irregular loads, unbalanced DC-link voltages, or during loading variations, for example, could make impossible the equalization of power losses not only among the bridge leg's components but also between different phase legs. This is particularly true because the variable which constitute the degree of freedom of the exemplary modulation scheme are commonly limited to the application requirements (e.g., switching frequency, fs, DC-link voltage, UDC, semiconductor technology, and the clamping pattern). Additionally, the current waveforms in each phase of the 3-level active filter VSC are necessarily similar, otherwise the power losses among the different phases will differ. Finally, during unbalanced DC-link voltage conditions the desired clamping of the phase current cannot be always attained due to the required control of the neutral point potential.

Exemplary embodiments of the present disclosure provide a method for the determination of control scheme of a voltage source converter (VSC), such as a neutral point clamped (NPC) VSC, for example. According to an exemplary embodiment, the method can include the following steps:

Positioning of a window of 120° within the phase cycle of the grid/load such the window is positioned around the center peak maximum of the negative half wave and the positive half wave of the grid/load. This window defines the time span within which clamping of the corresponding leg can be allowed.

Determining the frequency of the clamping carrier modulator to either be three times the basic frequency of the grid/load (third harmonic) or nine times the basic frequency of the grid/load (ninth harmonic). This determination can be based on visual inspection of the waveform of the grid/load or it can be based on an analysis of the waveform. The higher the frequencies of distortions and the more distortions, the more likely the higher clamping carrier modulator frequency has to be chosen. The determination can also be based on a simulation or an actual measurement as will be detailed further below.

Once the window and the frequency of the clamping carrier modulator is determined, the voltage source converter is operated under additional control of the clamping carrier modulator such that, depending on the on/off status of the clamping carrier modulator, the switching in the corresponding leg is interrupted so that the corresponding leg is clamped. According to an exemplary embodiment, the clamping can, however, occur only if within the above-mentioned window. If outside of the above-mentioned window, the clamping carrier modulator of the corresponding leg is essentially ignored, if within the above-mentioned window it is used for switching on/off the clamping. For additional optimization, it is now possible (but not necessary) to adapt further operating parameters, such as the phase shift of the clamping carrier modulator with respect to the grid/load. The clamping carrier modulator can be synchronized to the grid/load, and the relative phase can be used for optimization. According to an exemplary embodiment, the optimization can be carried out to lead to an optimum balance and as low as possible total loss. Further parameters which can be adapted in this optional step will be detailed further below.

An exemplary embodiment of the present disclosure provides a method for determining a control scheme for a neutral point clamped (NPC) voltage source converter (VSC), e.g., with 3 phases, and with at least 3 levels, such as a shunt active power filter, with a topology of three bridge legs between each of three phases of a grid and a neutral point, where each leg includes at least four active switches. Topologies such as those illustrated in FIGS. 1 *a*, *b*, and *d*, for example, can be controlled.

An exemplary embodiment of the present disclosure provides a clamping carrier modulator which is synchronized with the grid for the control of no-switching intervals. The clamping carrier modulator is configured to carry out the following method:

i) analyzing the waveform of the grid and/or a load voltage (ILR) and determining windows (3) of 120° within the voltage cycle of the grid/load, wherein the windows are centered around the positive and negative peak maximum of the grid/load voltage waveform. The windows defining the allowed period for no-switching of the corresponding bridge leg;

ii) operating and/or simulating the operation of the voltage source converter with a clamping carrier modulator frequency equal to the third harmonic frequency of the grid/load, wherein, if within the window, as a function of the clamping carrier modulator, the switching of the corresponding bridge leg is interrupted and clamped, and then analyzing the balance in the operating junction temperatures and/or power losses across the active switches, and analyzing the total losses of the voltage source converter;

iii) operating and/or simulating the operation of the voltage source converter with a clamping carrier modulator frequency equal to the ninth harmonic frequency of the grid/load, wherein, if within the window, as a function of the clamping carrier modulator, the switching of the corresponding bridge leg is interrupted and clamped, and then analyzing the balance in the operating junction temperatures and/or power losses across the active switches and the total losses of the voltage source converter;

iv) comparing the balance and the total losses of steps ii) and iii) and selecting either the clamping carrier modulator frequency according to step ii) or step iii) showing, as a primary criterion, the better balance and, as a secondary criterion, the lower total losses; and v) operating and/or simulating the operation of the voltage source converter with the selected clamping carrier modulator frequency, wherein as a function of the clamping carrier modulator the switching of the corresponding bridge leg is interrupted and clamped in as far as within the window, while iteratively changing at least one of the following operating parameters of the voltage source converter: switching frequency, DC-link voltage reference, duty cycle of clamping carrier modulator, phase shift of the clamping carrier modulator relative to the grid, and optimizing the balance in the operating junction temperatures and/or power losses across the active switches and the total losses of the voltage source converter as a function of the adjustment of these operating parameters until reaching optimum operation parameters for the control scheme.

According to an exemplary embodiment of the method within step v), initially, the phase shift of the clamping carrier modulator relative to the grid/load is systematically and/or iteratively adapted to find the optimum balance and/or total loss of the voltage source converter.

According to an exemplary embodiment, the voltage source converter is configured to operate as a shunt voltage source converter.

For compensation of imbalances of the DC-link voltage, the ratio of no-switching to switching intervals within the window (3) between the positive half wave and the negative half wave of the grid can be unbalanced.

The bandwidth of the current controller (G(s)) used in a corresponding DQ-frame based control concept can be selected to be at least 20 times, e.g., at least 50 times higher than for the main DC link voltage controller (H(s)). The bandwidth of the partial DC link voltage controller (R(s)) can be selected as at least less than one third, e.g., at least less than one fifth of the main voltage loop.

The voltage source converter can be a 3-level T-type VSC converter or 3-level A-NPC VSC converter, for example.

Exemplary embodiments of the present disclosure also provide a method of operating a voltage source converter, such as a shunt active power filter, using a control scheme as determined as outlined above.

According to an exemplary embodiment, the converter can be operated at a voltage in the range of 300-10000 V, such as in the range of 500-1500V and/or 700-1000 V, for example.

According to an exemplary embodiment, the converter can be operated using a switching frequency in the range of 100 Hz-1 MHz, e.g., in the range of 5 kHz-100 kHz.

An exemplary embodiment of the present disclosure also provides a non-transitory computer-readable recording medium having a computer program recorded thereon that causes a processor of a computer processing device (e.g., CPU) to execute the program to carry out a method as outlined above for the determination of the control scheme of 3-level VSC adapted to act as a photovoltaic grid inverter, a rectifier, a motor drive. As used herein, the term "computer-readable recording medium" connotes a non-transitory memory device functioning as a non-volatile memory, such as a ROM, hard disk drive, flash memory, optical memory, etc. It is to be understood that any of the functional features described herein can be implemented by a processor of a computer processing device executing a computer program recorded on a non-transitory computer-readable recording medium, where such computer program contains instructions for carrying out the features of the present disclosure.

The 3-level NPC topology as shown, for example, in FIG. 1(a) can be used in medium voltage range applications. NPC VSC is also a promising alternative for low-voltage applications. Compared to a 2-level VSC (cf. FIG. 1(c)), the 3-level NPC VSC features two additional active switches, two extra isolated gate drivers, and four diodes per phase leg. The 3-phase NPC VSC allows 27 switch states in the space-vector diagram, whereas the 2-level allows eight switch states only. Hence, the clearly superior controllability of the phase currents and DC-link voltage (UDC) are the most distinct advantage over the 2-level converter. Additionally, in applications such as photovoltaic grid inverters, rectifiers, motor drivers and active filters, 3-level NPC systems can achieve lower losses than conventional 2-level converters if the considered switching frequency is high enough.

Adding up two extra active switches per phase leg of the conventional NPC a substantial improvement of loss distribution can be achieved with the additional switching states and new commutations possibilities incorporated (cf. FIG. 1(b)). This configuration, Active NPC (A-NPC), allows a specific utilization of the upper and lower path of the neutral tap and, thus, affects the distribution of conduction and switching losses. When compared to a conventional 3-phase 3-level NPC topology, the 3-phase 3-level A-NPC requires 6 extra active switches and 3 extra isolated gate drivers. Therefore, the main factors preventing the 3-level A-NPC VSC from being successful in the active filter market are the substantial increase of costs and complexity. Note that, when compared to the conventional 2-level VSC (cf. FIG. 1(c)), which is wide spread in commercial systems, the A-NPC requires 12 extra active switches and isolated gate drives.

One disadvantage of the 3-level topologies is the active control of their neutral-point potential. Although under ideal condition the DC-link capacitor voltages naturally balance over one fundamental cycle, asymmetries in the semiconductor characteristics, different gate delay time, dynamic load changes, and/or unbalanced loads can cause a steady drift of the neutral-point potential. Since the 3-level topology offers redundant space vectors on the inner hexagon of the space vector diagram, it is possible to maintain the stability of the neutral point potential with no additional circuitry and no additional switching transitions.

In 3-level active filters, the commonly irregular load can lead to an uneven loss distribution in the semiconductors of a bridge leg. As in every converter the losses in the most stressed device limit the switching frequency and the power capability, a de-rating of the converter current can become mandatory to ensure long term-stability of the system.

The semiconductor chips assembled in a standard commercial 3-level bridge leg module are mostly dimensioned and rated neglecting the loss distribution over the specific elements. In this manner, due to the issue of loss distribution, the usage of these devices often results in an oversized design with expensive and weakly utilized semiconductor area. Additionally to that, modulation schemes used to enhance the system efficiency can contribute even more to the uneven loss distribution, increasing the difference of the operating temperature of the transistors and diodes inside the power module and/or widening their thermal cycling. The thermal mismatch of components leads to induced thermal stresses on the materials within the module and thermo-mechanical damage could arise. Consequently, the design of 3-level active filters becomes rather complex as the desired characteristics of high power density, efficiency and component reliability could work against each other.

To address the loss distribution issue of the 3-level VSCs, exemplary embodiments of the present disclosure provide a space vector modulation scheme incorporating an optimal clamping of the phase, as discussed in further detail below. This strategy can work to maximize the efficiency of the system and/or to improve the distribution of the component losses such that the variation of power/thermal stress of the individual elements in a bridge leg is minimized. Additionally, a suitable control method for balancing the DC-link voltages and, to some extent, maintaining the optimal clamping of the currents, is also provided.

For the converters presented herein, a space vector modulation scheme incorporating an optimal clamping of the phase, as described in B. Kaku, I. Miyashita, and S. Sone, "Switching loss minimized space vector pwm method for igbt three-level inverter," IEE Proceedings. Electric Power Applications, Vol. 144, pp. 182-190, May 1997, is implemented. The output voltage vector can be formed with the three nearest discrete voltage space vectors. Since the 3-level topology offers redundant space vectors on the inner hexagon, it is possible to implement an optimal clamping strategy in order to reduce switching losses.

In the modulation scheme according to an exemplary embodiment of the present disclosure, each phase leg of a 3-level VSC can have its switching operation stopped for 120 degrees in one period without degrading the performance of the system. When aiming for high efficiency during high operating frequency, one would naturally avoid switching the phase leg with the highest current values, while keeping the loss distribution among the phase legs of the converter symmetric. However, during this process the commonly irregular currents of the active filter can lead to a strongly uneven power loss distribution across the semiconductors of a bridge leg. In cases where standard commercial power modules are used, the loss distribution issue can increase the difference of the operating temperature of the transistor and diodes inside this device and/or widening their thermal profile, directly affecting the reliability of these components.

Figure 2A:
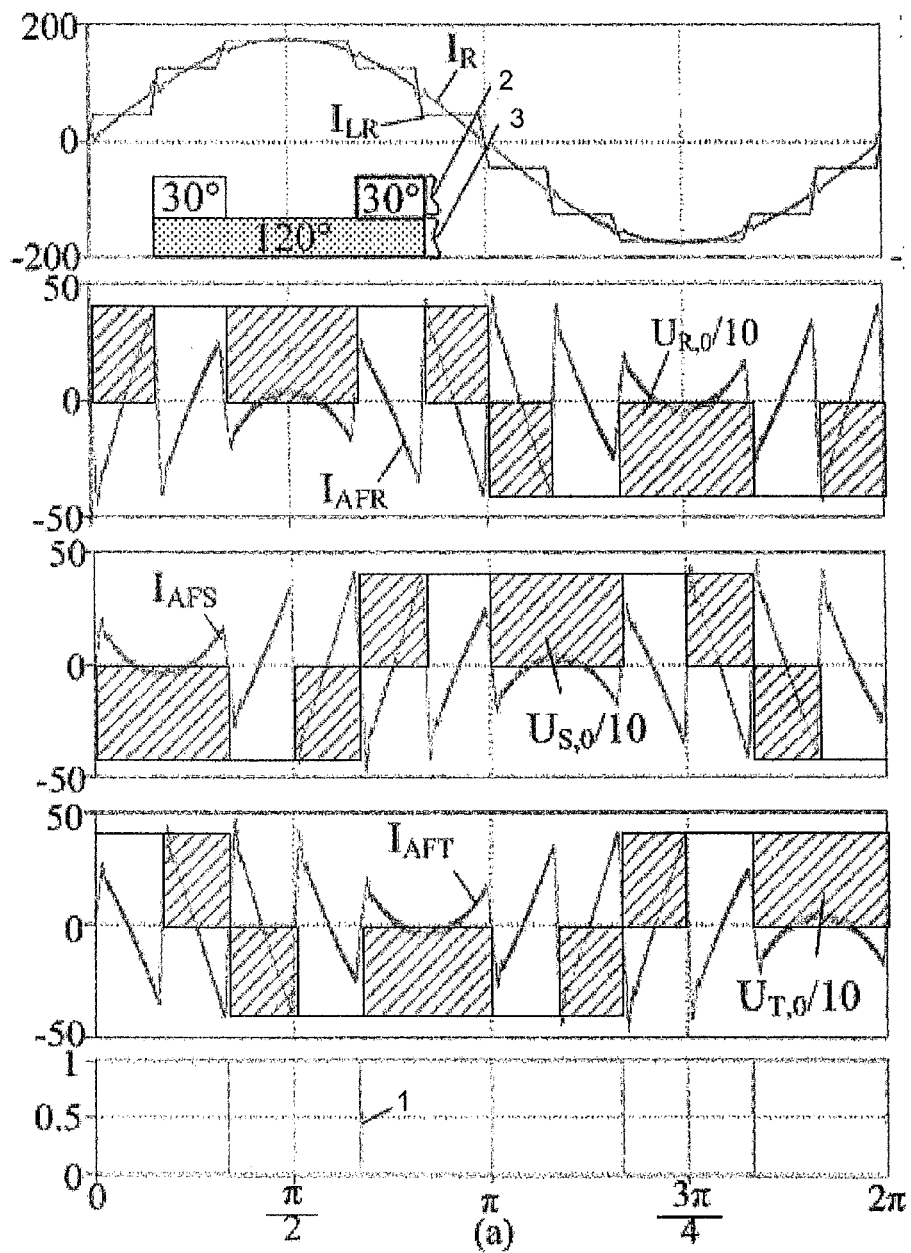
FIG. 2 shows 3-level active filter modulation schemes: (a) clamping strategy with 3rd harmonic frequency carrier; (b) clamping strategy with 9th harmonic frequency carrier; and (c) clamping strategy during imbalanced DC-link capacitor voltages with 9th harmonic frequency carrier.
Figure 2B:
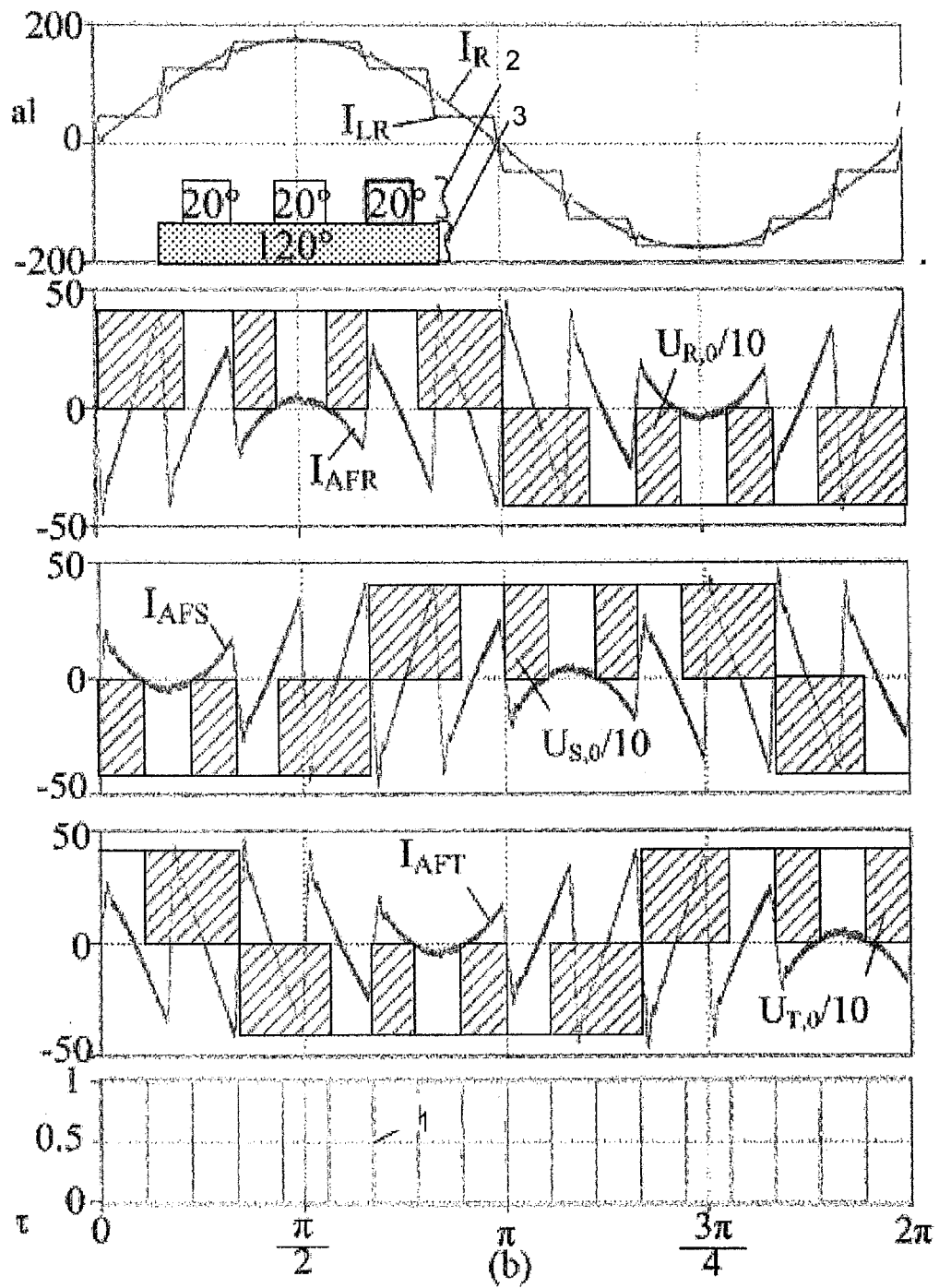

In accordance with an exemplary embodiment, depending on the current shape of the load compensated by the active filter the top and bottom DC-link capacitors are alternately loaded according to a carrier signal with 3 or 9 times the fundamental frequency of the grid. FIGS. 2(a) and 2(b) show both modulation strategies adjusted for a 3-phase 12-pulse diode rectifier with constant output current as load. Therein, especially for high frequency operation, a considerable reduction of losses would be achieved by clamping the bridge leg which handles the highest current values (cf. FIG. 2(a)). By increasing the frequency of the clamping process and avoiding that the switching intervals match the instant of high current values, a better controllability of the loss distribution among the bridge leg components can be obtained (cf. FIG. 2(b)).

In these FIG. 2 in the top row one can see the above-mentioned window 3 within which no switching is allowed, and which is centered around the maximum of the positive half wave and the negative half wave (in a) and b) only the window for the positive half wave is indicated. In the figure, $I_{LR}$ represents the load current and $I_R$ represents the compensated current. As one can see only within the window 3 depending on the switching state of the modulation carrier 3 as illustrated in the bottom row non-switching, i.e. clamping of the corresponding leg, is allowed. Outside of the window 3 the modulation carrier 1 is essentially ignored. If the carrier 1 is on zero level and if one is within window 3 clamping is allowed, as indicated by the actual no switching intervals 2 graphically. Depending on the phase shift between the modulator 1 and the grid the corresponding blocks are shifted, so for example if in the left column of FIG. 2 the carrier is shifted by 5° relative to the grid one of the intervals 2 will become 35° and the other one will become 25°. The phase shift can be used for optimization of the balance. In the central column of FIG. 2 shifting the phase of the modulator will only lead to a corresponding shifting of the three 20° intervals until one of them reaches the end of the 120° window. The same holds true for the example in the rightmost column FIG. 2. The latter example shows how it is possible to adjust imbalances in the DC link by differentiating between the clamping in the positive half wave and in the negative half wave.

According to an exemplary embodiment, the same modulation carrier can be used for all three phases. For example, for symmetry reasons, the three phases R (second row), S (third row) and T (fourth row) are only shifted by 120° relative to each other as concerns the compensated current $I_{AFR}$ as well as the voltage $U_{R,0}$. The hatched areas indicate the timespans within which the switching takes place. Note that both clamping strategies are intended to balance the operating junction temperatures and/or the power losses across the transistors (e.g., IGBTs), while the total losses of the system are minimized. Accordingly, mainly the operating switching frequency needs to be strategically selected. In fact, the loss distribution across the components of a bridge leg is strongly dependent on the switching frequency and DC-link voltage operation. These variables are proportional to the switching losses and they can be used together with the current clamping scheme to optimally design the active filter for a specific semiconductor technology and compensated load.

Figure 2C:
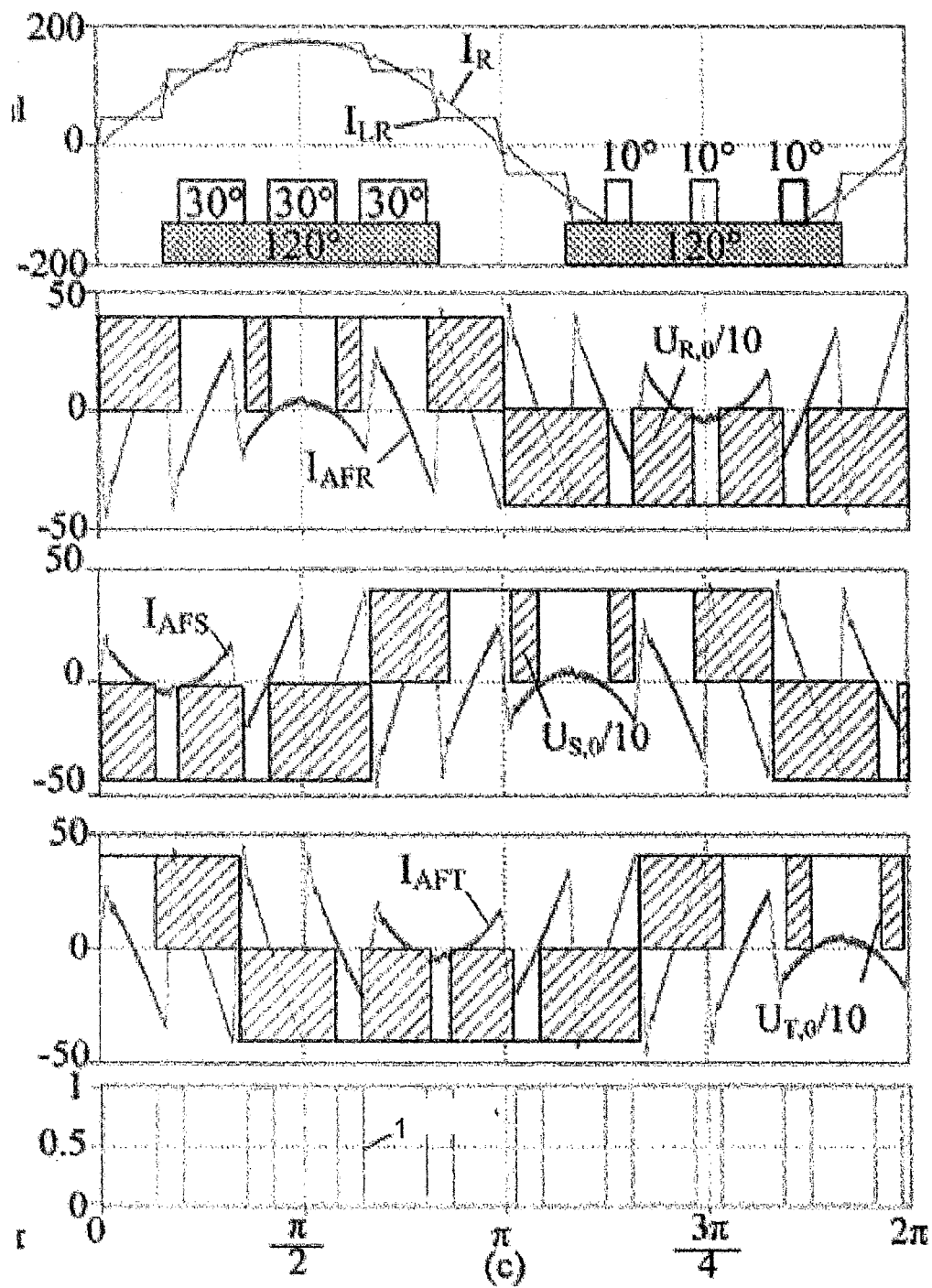

In order to keep the balancing of the DC-link capacitor voltages unaltered and the loss distribution among the phase legs of the converter symmetric over one fundamental cycle, a proper selection of the redundant zero vectors is required. This condition is found when the duty cycle (D) of the carrier is set to 50%. Any other duty cycle value produces an asymmetric modulation and it can be used for the balancing control of the DC-link capacitor voltages as shown in FIG. 2(c). For D>50% the upper DC-link capacitor is charged while the bottom capacitor is discharged. When D<50% the capacitor charging cycle is changed.

Figure 3:
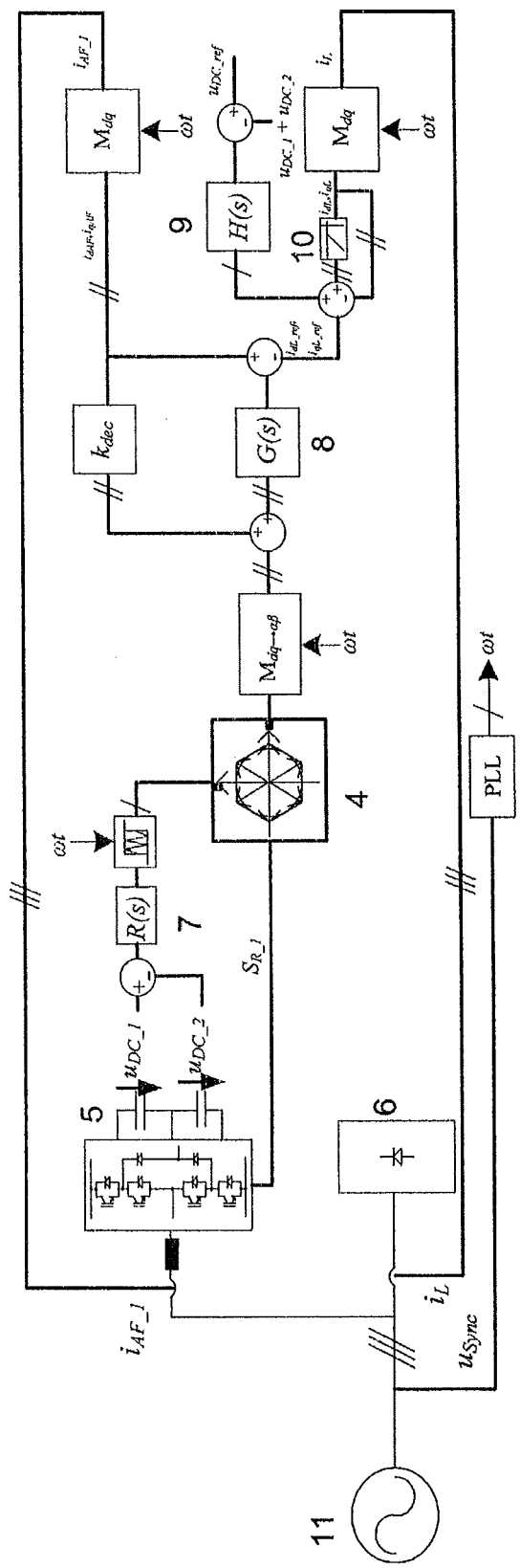
FIG. 3 shows the active filter control strategy based on DQ-frame theory.

The DQ-Frame based control concept suitable for the 3-level active filters considered here is shown in FIG. 3. It includes a fast current control loop and a slow voltage loop. Additionally, there is a partial DC-link voltage control which acts to balance the DC-link capacitor voltages. Note that other strategies such as PQ theory, Fryze currents, generalized integrators, frequency domain strategies (DFT, RDFT and FFT), etc., can also be employed.

Figure 4:
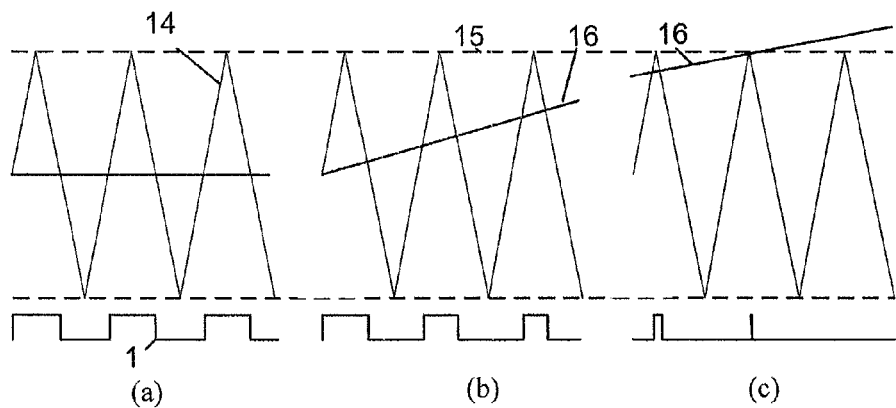
FIG. 4 shows a partial DC-link voltage control scheme: (a) balanced condition; (b) light imbalanced DC-link voltages, partially preserving clamping; and (c) high voltage imbalances requiring hysteresis control.

In order to obtain a good controllability of the active filter currents the current controller (G(s)) bandwidth is selected as fifty times higher than for the main DC-link voltage controller (H(s)). Therein, a high voltage control error occurring due to the small controller gain can be prevented by increasing the controller gain proportionally to the error signal. In order to, in some extent, maintain the optimal clamping of the currents during imbalances of the DC-link voltages, the bandwidth of the partial DC-link voltage controller (R(s)) is selected as one fifth (⅕) of the main voltage loop. A non-linear control combining hysteresis and linear concepts is employed as shown in FIG. 4. For low voltage imbalances, the output signal of the R(s) controller is compared to a PWM modulator with 3 or 9 times the mains frequency. This determines the carrier duty cycle that selects one of the redundant zero vectors on the inner hexagon of the space vector modulation scheme. For high voltage imbalances, the modulator saturates and a hysteresis-like control takes over. Note that high values for the DC-link capacitors are desired to sudden the voltage variations, avoiding then the operation of the hysteresis control.

The synchronization of the carrier modulator with the grid voltages or load currents is essential to perform the clamping during the desired non-switching intervals. The optimal current clamping can be previous defined by an accurate analysis of the necessarily known load currents. In cases where the displacement of the load current varies considerably with the handled power, a look-up table can be built to tune the carrier according to the instant power processed by the load. In cases where the load is unknown, the clamping strategy could be adapted during operation with an algorithm which predicts the losses across the transistors of one phase leg. The calculation needs to incorporate the space vector modulation such that the impact of the current clamping pattern is considered correctly according to the compensated load. With the defined modulation index, the relative on-times/transitions of the discrete voltage space vectors can be determined. Thus, combined these information with the known conduction/switching loss characteristics of the employed semiconductors, the averaged conduction and switching losses over one switching period can be calculated. By storing the loss data calculated in each switching period, the mean losses over a fundamental grid period in each transistor device can be obtained recursively. Finally, after every switching period, adjusts on the variables, directly related to component losses, can be performed in order to equalize power losses in these devices (switching frequency, fs, DC-link voltage reference, uDC_ref, clamping pattern's duty cycle, D, and phase, $\phi$).

In order to quantify the feasibility of the exemplary loss minimized space vector modulation, simulations are performed for a 3-phase 3-level NPC active filter rated to 12 kVAr. This system operates with a 230 Vrms/50 Hz grid voltage at 30 kHz switching frequency and 800V DC-link. The 3-level Trench and Field Stop IGBT power module F3L50R06W1E3_B11 is selected and its loss characteristics and thermal models are obtained directly in the datasheet. The loss analyses are performed for nominal operation of the active filter with a 3-phase 12-pulse diode rectifier with constant output current as load. For comparative purposes, three modulation schemes are analyzed: the conventional SPWM method in which there is no reduction of switching control; and the two clamping strategies provided herein, one guided by a carrier signal with 3 (cf. FIG. 2(a)) and other with 9 (cf. FIG. 2(b)) times the fundamental frequency of the grid.

Figure 5:
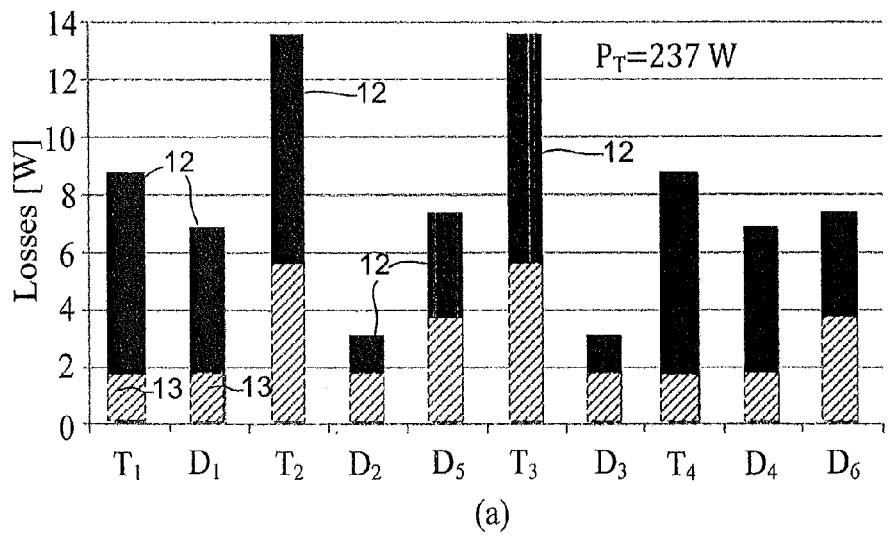
FIG. 5 shows the bridge leg components loss distribution: (a) conventional SPWM; (b) clamping strategy with 3rd harmonic frequency carrier; and (c) clamping strategy with 9th harmonic frequency carrier, in each case solid black bars 12 indicate switching losses (40 kHz) and hatched bars 13 indicate conduction losses.
Figure 5:
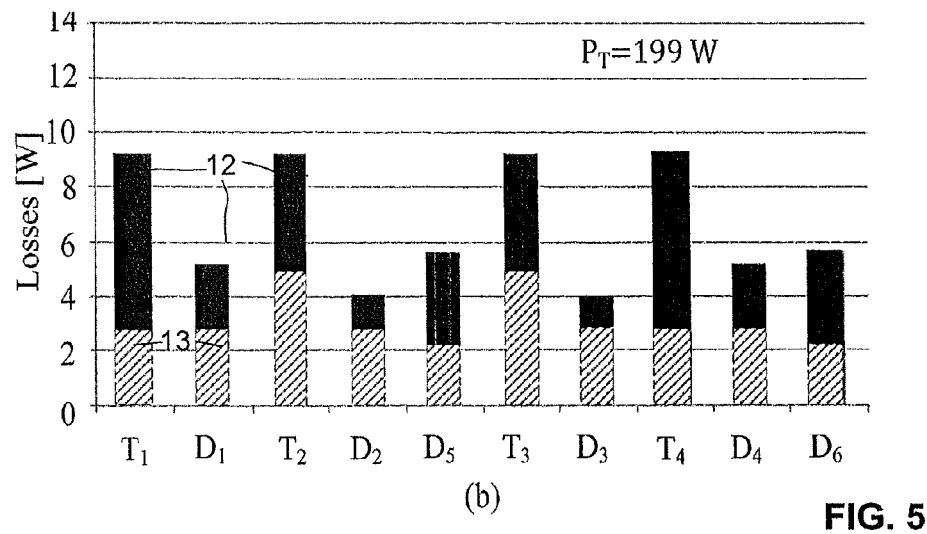
Figure 5:
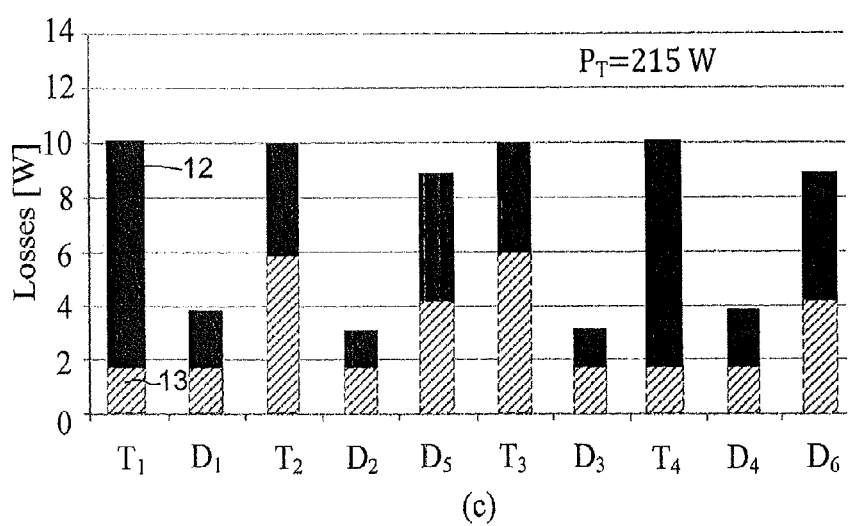
Figure 6:
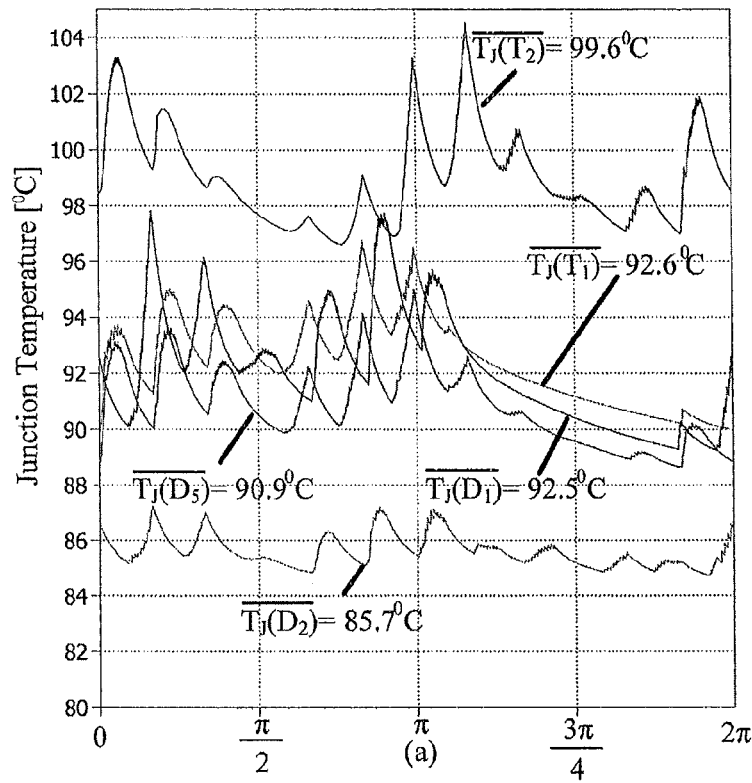
FIG. 6 shows the bridge leg components operating junction temperature: (a) conventional SPWM; (b) clamping strategy with 3rd harmonic frequency carrier; and (c) clamping strategy with 9th harmonic frequency carrier.
Figure 6:
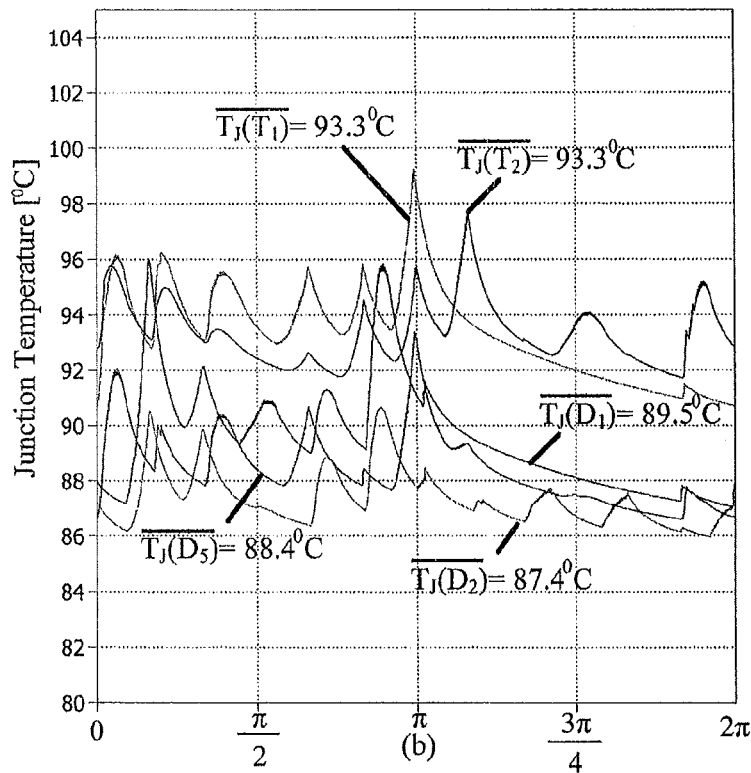
Figure 6:
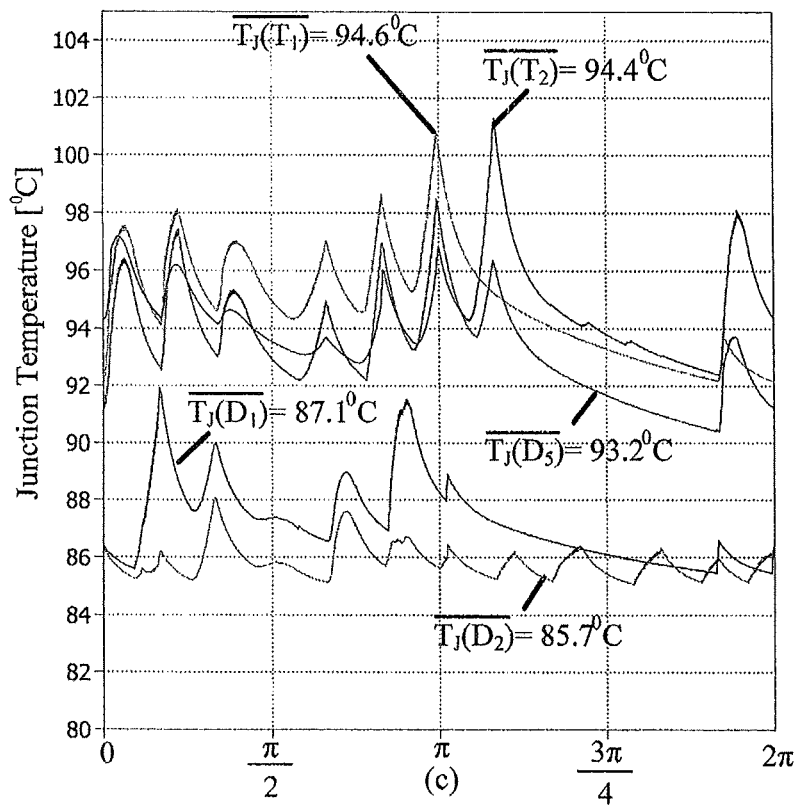

The resulting averaged power loss distribution and the operating junction temperature (TJ) of the individual elements in a bridge leg are shown in FIG. 5 and FIG. 6, respectively. In FIG. 6 a constant heat sink temperature (THS) of 80° C. is considered in the analysis. It can be noticed that the system operating with SPWM modulation results in the lowest efficiency, as a total semiconductor loss (PT) of 237 W exists (79 W per power module). By avoiding switching currents with high values, the clamping strategies guided by a signal with a 3rd and 9th harmonic pattern obtain a loss reduction of 16% and 9.3%, respectively. Additionally, the operating junction temperatures of the upper/bottom and inner IGBTs or diodes are well balanced and symmetric for all bridge legs (cf. FIG. 6(b)).

The exemplary clamping strategies described herein are intended to balance the operating junction temperatures and/or the power losses across the IGBTs, while the total losses of the system are minimized. Accordingly, for the studied example, the operating switching frequency was strategically selected with the aim that for both exemplary modulation schemes these goals could be successfully attained. In fact, the loss distribution across the components of a bridge leg is strongly dependent on the switching frequency and DC-link voltage operation. These variables are proportional to the switching losses and they can be used together with the current clamping scheme to optimally design the active filter for a specific semiconductor technology.

It is to be understood that the clamping scheme according to any of the exemplary embodiments described herein can be used for other 3-level VSC topologies, such as the T-type VSC depicted in FIG. 1(d). In the following section, suitable shunt active filters derived from the 2-level VSC, the 3-level NPC and the T-type converter are presented. An efficiency comparison between these converters employing the exemplary space vector modulation scheme incorporating an optimal clamping of the phase is shown, for operation in the switching frequency range of 5 kH to 50 kHz and low DC-link voltage level ($U_{DC}$=800V). A 3-phase 12-pulse diode rectifier with constant output current is considered in the loss analyses with switching loss measurements of commercial semiconductors obtained in a test setup.

Efficiency calculation of 2-level and 3-level active filters:

In this section an efficiency comparison between 12 kVAr rated 3-phase shunt active filters derived from the 2-level VSC, the 3-level NPC and the T-type converter is presented. A 3-phase 12-pulse diode rectifier is considered as load in the loss analyses with switching loss measurements of commercial semiconductors obtained on the test setup.

Note that for an accurate analysis of the switching losses just the information from the datasheets would not be enough to enable a fair comparison among the studied systems. Due to the mismatch of voltage rated devices in the T-type topology, the turn-on energy of the 1200V IGBTs will be lower if the commutating diode is only 600V rated because of the considerably lower reverse recovery charge. In the same matter, the 600V device turn-on loss energy will be higher if the commutating diode is 1200V rated.

Calculation of the active filter topologies efficiency:

The efficiency of each active filter studied here is determined with an algorithm similar to the one presented in M. Schweizer, T. Friedli, and J. W. Kolar, "Comparison and implementation of a 3-level npc voltage link back-to-back converter with sic and si diodes," in Proc. Twenty-Fifth Annual IEEE Applied Power Electronics Conf. and Exposition (APEC), pp. 1527-1533, 2010. The calculation incorporates the space vector modulation such that the impact of the optimal clamping is considered correctly according to the compensated load. With a defined modulation index, the relative on-times/transitions of the discrete voltage space vectors can be determined. Thus, the averaged conduction losses and the switching losses over one switching period can be calculated. Finally, the mean losses over a fundamental period in each device can be obtained by integrating the corresponding expressions over the full mains voltage period.

Figure 7:
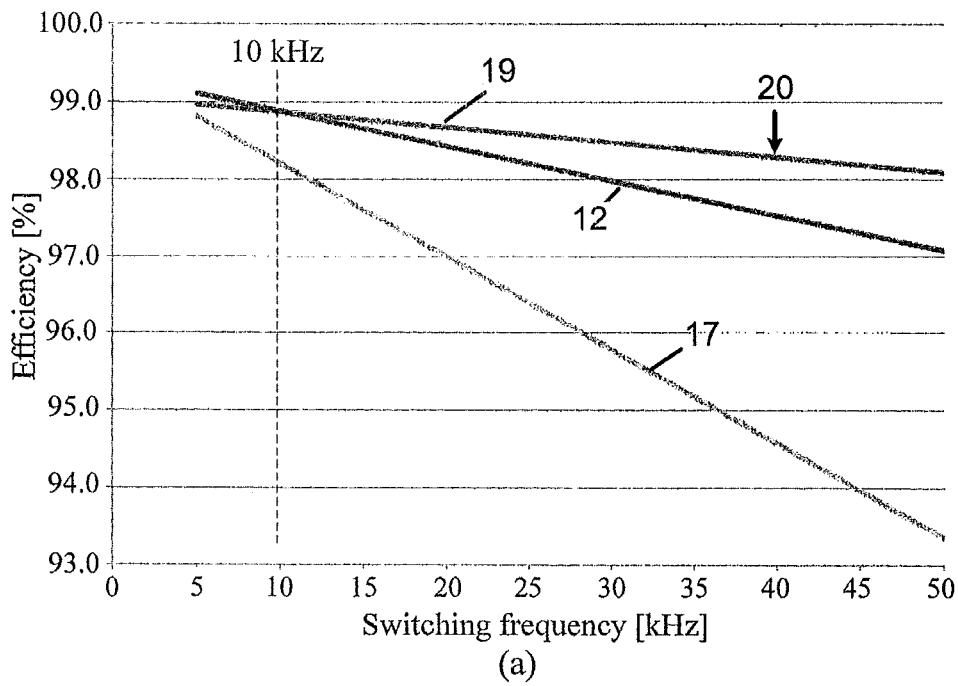
FIG. 7 shows an efficiency comparison between the different topologies of 12 kVAr active filters employing commercial semiconductors: (a) clamping strategy with 3rd harmonic frequency carrier; and (b) clamping strategy with 9th harmonic frequency pattern.
Figure 7:
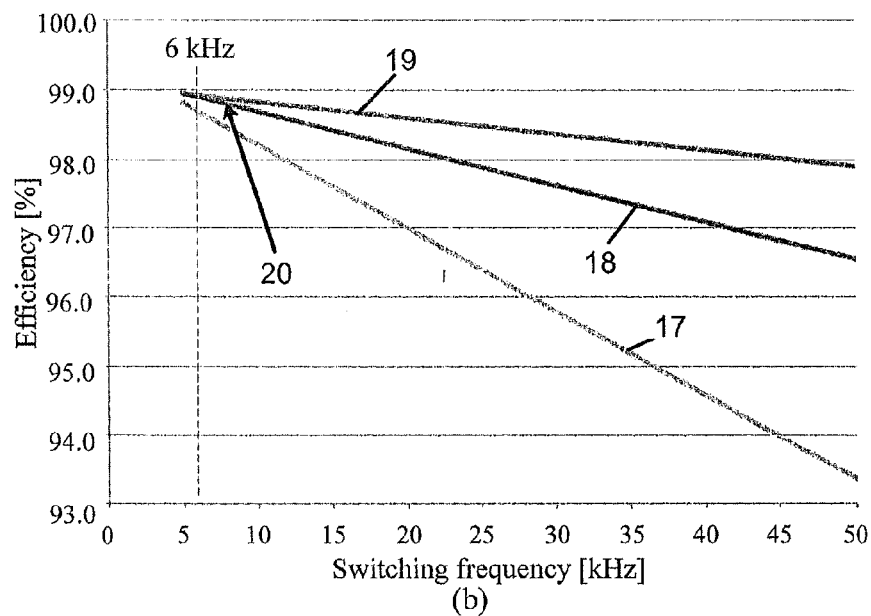

In FIG. 7 the pure semiconductor efficiency of 12 kVAr shunt active filters derived from the 2-level VSC, the 3-level NPC and the T-type converter is presented for operation in the switching frequency range of 5 kH to 50 kHz and low DC-link voltage level ($U_{DC}$=800V). In this analysis the loss data of the commercial IGBTs IKW25T120 and the IKW30N60T obtained with the test setup are used for the comparison when a 3-phase 12-pulse diode rectifier with constant output current is considered as load. For the calculation of the 3-level T-type topology efficiency, the same algorithm accounting for the exemplary space vector modulations as for the NPC converter is employed.

Since the 1200V devices in the T-type active filter are mostly commuted at half DC-link voltage instead of the always 800V in the 2-level VSC, the switching losses are considerably reduced. Therefore, for low switching frequency values, the 3-level T-type active filter already shows superior performance than the conventional 2-level version. Compared to the 3-level NPC topology, the T-type system has lower conduction losses, but higher switching losses. In this manner, in both clamping strategies the efficiency of the T-type converter is outstanding for up to 10 kHz switching frequency (cf. FIG. 7). On the other hand, for switching frequencies above 10 kHz, the 3-level NPC topology is superior.

Figure 8:
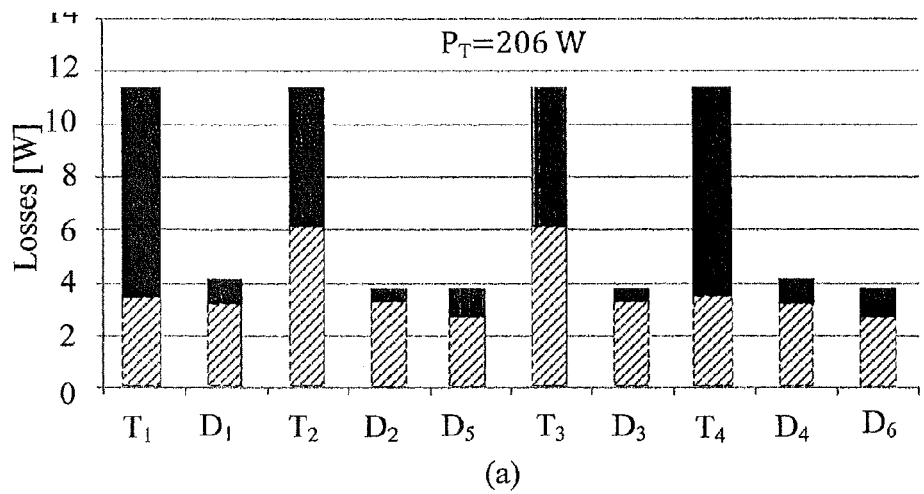
FIG. 8 shows the bridge leg components loss distribution for: (a) 3-level NPC, and (b) T-type active filter operating at 40 kHz with 3rd harmonic clamping pattern; and (c) 3-level T-type active filter operating at 8 kHz with 9th harmonic clamping pattern, in each case solid black bars 12 indicate switching losses (40 kHz) and hatched bars 13 indicate conduction losses.
Figure 8:
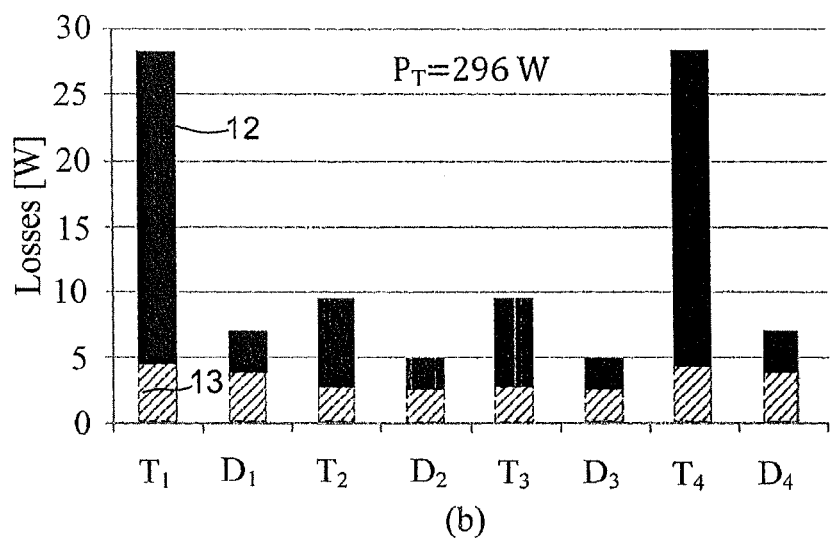
Figure 8:
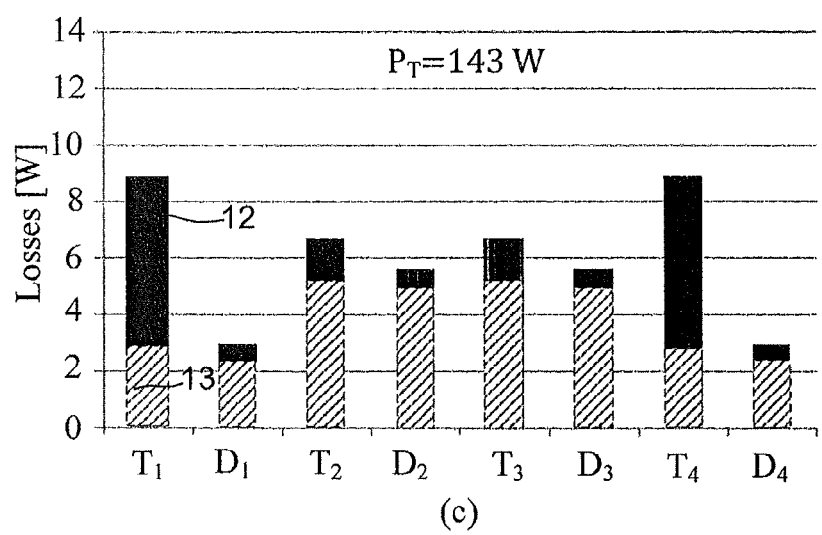

FIGS. 8(a) and 8(b) show the bridge leg components mean power loss distribution for the 3-level NPC and the T-type active filters operating at 40 kHz switching frequency, respectively. As can be observed the overall switch utilization of the T-type active filter is extremely low. On the other hand, the 3-level NPC active filter achieves an outstanding performance, enabling that all semiconductor chips for IGBTs or diodes operate with similar junction temperatures. For the T-type VSC, the optimum switch utilization occurs at low switching frequency (8 kHz) and, in the switching frequency range of 5 kHz to 50 kHz, it can only be reached by the clamping strategy with 9th harmonic pattern. FIG. 8(c) shows the T-type active filter performance for this operation.

The strategy according to the exemplary embodiments described herein was applied to 3-level active filters; however other industrial applications employing 3-level VSCs, such as photovoltaic grid inverters, rectifiers, motor drivers, among others, can also take advantage of this concept. The modulation strategy presented here can also be combined with the active NPC (A-NPC) topology, in order to not only improve the loss distribution among the component of the phase leg, but also to enhance the efficiency of this system.

| LIST OF REFERENCE SIGNS | |
|---|---|
| 1 | Clamping carrier, carrier modulator |
| 2 | actual no switching interval |
| 3 | possible no switching interval |
| 4 | space vector modulation |
| 5 | active filter |
| 6 | nonlinear load |
| 7 | partial voltage controller |
| 8 | current controller |
| 9 | voltage controller |
| 10 | lowpass filter |
| 11 | grid |
| 12 | switching losses (30 kHz), solid black bars |
| 13 | conduction losses, hatched bars in FIG., 5 |
| 14 | PWM modulator |
| 15 | hysteresis control level |
| 16 | control level |
| 17 | 2-level |
| 18 | 3-level T-type |
| 19 | 3-level NPC |
| 20 | balanced IGBT's Tj for 3-level NPC |
| 21 | bridge leg of R-phase |
| 22 | bridge leg of S-phase |
| 23 | bridge leg of T-phase |
| 24 | neutral point |

The invention claimed is:

1. A method for determining a control scheme for a neutral point clamped (NPC) voltage source converter (VSC) with at least 3 levels and a topology of three bridge legs between each of three phases of a grid and a neutral point, each leg including at least four active switches,
wherein a clamping carrier modulator is synchronized with the grid for the control of no-switching intervals, and performs the method, which comprises:
i) analyzing the waveform of at least one of the grid and a load voltage ($I_{LR}$), and determining windows of 120° within the voltage cycle of the grid/load, wherein the windows are centered around a positive and negative peak maximum of the grid/load voltage waveform, the windows defining an allowed period for no-switching of the corresponding bridge leg;
ii) operating and/or simulating an operation of the voltage source converter with a clamping carrier modulator frequency equal to the third harmonic frequency of the grid/load, wherein, if within the window, as a function of the clamping carrier modulator the switching of the corresponding bridge leg is interrupted and clamped, and then analyzing the balance in the operating junction temperatures and/or power losses across the active switches and also analyzing the total losses of the voltage source converter;
iii) operating and/or simulating the operation of the voltage source converter with a clamping carrier modulator frequency equal to the ninth harmonic frequency of the grid/load, wherein, if within the window, as a function of the clamping carrier modulator, the switching of the corresponding bridge leg is interrupted and clamped, and then analyzing the balance in the operating junction temperatures and/or power losses across the active switches and the total losses of the voltage source converter;
iv) comparing the balance and the total losses of steps ii) and iii) and selecting either the clamping carrier modulator frequency according to step ii) or step iii) showing, as primary criterion, the better balance and, as secondary criterion, the lower total losses;
v) operating or simulating the operation of the voltage source converter with the selected clamping carrier modulator frequency, wherein as a function of the clamping carrier modulator the switching of the corresponding bridge leg is interrupted and clamped in as far as within the window, while iteratively changing at least one of the following operating parameters of the voltage source converter: switching frequency, DC-link voltage reference, duty cycle of clamping carrier modulator, phase shift of the clamping carrier modulator relative to the grid, and optimising the balance in the operating junction temperatures and/or power losses across the active switches and the total losses of the voltage source converter as a function of the adjustment of these operating parameters until reaching optimum operation parameters for the control scheme.

2. The method according to claim 1, wherein the converter is operated using a switching frequency in the range of 5 kHz-100 kHz.

3. The method according to claim 1, wherein the voltage source converter is configured to operate as a shunt voltage source converter.

4. The method according to claim 1, wherein for compensation of imbalances of the DC-link voltage, the ratio of no-switching to switching intervals within the window between the positive half wave and the negative half wave of the grid is unbalanced.

5. The method according to claim 1, wherein the bandwidth of the current controller is selected to be at least 5 times higher than for the main DC link voltage controller.

6. The method according to claim 5, wherein the bandwidth of the current controller (G(s)) is selected to be at least approximately 50 times higher than for the main DC link voltage controller (H(s)).

7. The method according to claim 1, wherein the voltage source converter is one of a 3-level T-type VSC converter and a 3-level A-NPC VSC converter.

8. A method of operating a voltage source converter using a control scheme determined according to claim 1.

9. The method according to claim 1, wherein the converter DC-link voltage is operated at a voltage in the range of 300-10,000 V.

10. The method according to claim 1, wherein the converter is operated using a switching frequency in the range of 100 Hz-1 MHz.

11. A non-transitory computer-readable recording medium having a computer program recorded thereon that causes a processor of a computer processing device to carry out the method of claim 1.

12. The method according to claim 1, wherein the 3-level VSC is configured to operate as one of a photovoltaic grid inverter, a rectifier, and a motor drive.

13. The method according to claim 1, wherein the 3-level VSC is a shunt active filter.

14. The method according to claim 1, wherein the bandwidth of the partial DC link voltage controller is selected as at least less than one third of the main voltage loop.

15. The method according to claim 6, wherein the bandwidth of the partial DC link voltage controller is selected as at least less than one fifth of the main voltage loop.

16. The method according to claim 1, wherein the converter DC-link voltage is operated at a voltage in the range of 700-1,000 V.

17. The method according to claim 1, wherein step v) comprises initially iteratively adapting the phase shift of the clamping carrier modulator relative to the grid/load to find the optimum balance and/or total loss of the voltage source converter.

18. The method according to claim 2, wherein the voltage source converter is configured to operate as a shunt voltage source converter.

19. The method according to claim 18, wherein for compensation of imbalances of the DC-link voltage, the ratio of no-switching to switching intervals within the window between the positive half wave and the negative half wave of the grid is unbalanced.

20. The method according to claim 19, wherein the bandwidth of the current controller is selected to be at least 5 times higher than for the main DC link voltage controller.

21. The method according to claim 20, wherein the bandwidth of the partial DC link voltage controller is selected as at least less than one third of the main voltage loop.

22. The method according to claim 21, wherein the voltage source converter is one of a 3-level T-type VSC converter and a 3-level A-NPC VSC converter.

23. A method of operating a voltage source converter using a control scheme determined according to claim 22.

24. The method according to claim 22, wherein the converter DC-link voltage is operated at a voltage in the range of 300-10,000 V.

25. The method according to claim 22, wherein the converter is operated using a switching frequency in the range of 100 Hz-1 MHz.

26. A non-transitory computer-readable recording medium having a computer program recorded thereon that causes a processor of a computer processing device to carry out the method of claim 22.

\* \* \* \* \*